United States Patent [19]

Sloot

[11] Patent Number: 5,251,337
[45] Date of Patent: * Oct. 12, 1993

[54] METHOD OF MANUFACTURE OF INFLATABLE APPLIQUE

[75] Inventor: Alexander Sloot, Stamford, Conn.

[73] Assignee: Printmark Industries, Inc., Hazleton, Pa.

[*] Notice: The portion of the term of this patent subsequent to Jan. 14, 2009 has been disclaimed.

[21] Appl. No.: 818,795

[22] Filed: Jan. 9, 1992

Related U.S. Application Data

[63] Continuation-in-part of Ser. No. 543,668, Jun. 25, 1990, Pat. No. 5,079,778.

[51] Int. Cl.$^5$ .............................................. A41D 27/00
[52] U.S. Cl. ........................................ 2/243.1; 2/115; 2/69; 446/28; 5/419; 5/449; 5/932
[58] Field of Search ............. 2/46, 49 R, 69, 75, 2/79, 85, 86, 87, 93, 94, 115, 105, 244, 243 R, 243 A, 243 B; 446/26, 27, 28, 220, 226; 5/419, 449, 644, 932; 428/79

[56] References Cited

U.S. PATENT DOCUMENTS

| | | | |
|---|---|---|---|
| 1,222,563 | 4/1917 | Rosenberg . | |
| 1,284,352 | 11/1918 | Jasinski | 2/DIG. 3 X |
| 1,468,072 | 9/1923 | Ogle | 2/DIG. 3 X |
| 1,803,898 | 5/1931 | Diamond . | |
| 2,028,060 | 1/1936 | Gilbert | 2/2 X |
| 2,446,006 | 7/1948 | Hendricks | 2/2 |
| 2,582,648 | 1/1952 | Mowbray | 2/2 X |
| 2,607,934 | 8/1952 | Bailhe | 2/DIG. 3 X |
| 2,729,010 | 1/1956 | Markus et al. | 428/79 X |
| 2,883,682 | 4/1959 | Kwake | 5/344 |
| 2,898,609 | 8/1959 | Storie | 5/344 |
| 3,008,214 | 11/1961 | Foster | 2/2 X |
| 3,016,544 | 1/1962 | Pinkney | 2/49 R |
| 3,082,437 | 3/1963 | Upthagrove | 5/344 |
| 3,176,315 | 4/1965 | Freund | 2/69 |
| 3,451,882 | 6/1969 | Propoggio | 161/17 |
| 3,629,034 | 12/1971 | Kuroda | 156/219 |
| 3,629,035 | 12/1971 | Kuroda | 156/219 |
| 3,689,947 | 9/1972 | Wolf | 5/344 |
| 3,730,814 | 5/1973 | Kuroda | 156/515 |
| 3,756,888 | 9/1973 | Kuroda | 156/220 |
| 3,758,358 | 9/1973 | Kuroda | 156/222 |
| 3,777,310 | 12/1973 | Yang | 428/79 X |
| 3,783,156 | 1/1974 | Kuroda | 264/94 |
| 3,843,437 | 10/1974 | Robinson | 156/219 |
| 3,855,043 | 12/1974 | Kuroda | 161/5 |
| 3,868,288 | 2/1975 | Ercolano | 156/248 |
| 3,944,454 | 3/1976 | Burgheimer | 156/273 |
| 4,089,065 | 5/1978 | McGee | 2/DIG. 3 X |
| 4,120,053 | 10/1978 | Nemirofsky | 2/115 |
| 4,157,272 | 6/1979 | Kuroda | 156/219 |
| 4,200,942 | 5/1980 | Case | 5/419 |
| 4,226,902 | 10/1980 | Webb | 428/7 |
| 4,231,125 | 11/1980 | Tittl | 5/419 |
| 4,310,927 | 1/1982 | DeBose | 2/115 |
| 4,316,287 | 2/1982 | Rule | 2/69.5 |
| 4,370,755 | 2/1983 | Crumby | 2/DIG. 3 X |
| 4,531,919 | 7/1985 | Ware | 2/69 X |
| 4,546,507 | 10/1985 | Weinstein | 5/419 |
| 4,772,503 | 9/1988 | Donsky | 428/79 |
| 4,815,149 | 3/1989 | Erhardt et al. | 2/243 |
| 4,834,688 | 5/1989 | Jones | 2/115 X |
| 4,837,864 | 6/1989 | Thill | 2/244 |
| 4,838,965 | 6/1989 | Bussard | 156/83 |
| 4,870,706 | 10/1989 | Ketcham et al. | 2/DIG. 3 x |
| 4,875,238 | 10/1989 | Solomon et al. | 446/28 x |
| 5,048,123 | 9/1991 | Monson | 3/DIG. 3 X |
| 5,079,778 | 1/1992 | Sloot | 2/69 |

FOREIGN PATENT DOCUMENTS

| 1509022 | 9/1989 | U.S.S.R. | 2/DIG. 3 |
| 964086 | 7/1964 | United Kingdom | 2/DIG. 3 |

Primary Examiner—Clifford D. Crowder
Assistant Examiner—Jeanette E. Chapman
Attorney, Agent, or Firm—St. Onge Steward Johnston & Reens

[57] ABSTRACT

An inflatable applique for an fabric article comprises a valved, substantially airtight enclosure having a top layer and a backing layer with complementary peripheral outlines. In the method of manufacture, the top and backing layers are welded together preferably simultaneously with the attachment of the enclosure to a clothing article. Various decorative elements may be given to the top layer, such as printing and embossing. The top layer may also be welded to the backing layer within the peripheral outlines to create inflatable subenclosures to give the applique a sculpted appearance.

12 Claims, 14 Drawing Sheets

METHOD OF MANUFACTURE OF INFLATABLE APPLIQUE

This is a continuation-in-part of copending application Ser. No. 07/543,668 filed on Jun. 25, 1990, now U.S. Pat. No. 5,079,778.

FIELD OF THE INVENTION

The present invention relates to appliques made of vinyl and other plastics, and specifically to inflatable appliques applied to articles of clothing.

BACKGROUND OF THE INVENTION

Vinyl appliques are known and have been made by a variety of methods. For example, a vinyl sheet may be imprinted, cut to a desired shape with a die, and attached to a fabric by heat welding, sewing, or gluing. In more sophisticated methods, a vinyl sheet is imprinted, and then welded to the fabric by radio frequency welding, ultrasonics, or vibration. In the more sophisticated processes, the vinyl sheet may also be cut to shape at the same time as the welding step, so that excess vinyl can be peeled off. It is also known to place a sheet of a foam material between the vinyl and the fabric to provide an applique with a three-dimensional or puffy appearance. Examples of these more sophisticated processes are U.S. Pat. No. 3,629,035 dated Dec. 21, 1970 to Kuroda, U.S. Pat. No. 3,629,034 dated Dec. 21, 1970 to Kuroda, U.S. Pat. No. 3,730,814 dated May 1, 1973 to Kuroda, U.S. Pat. No. 3,756,888 dated Sep. 4, 1973 to Kuroda, U.S. Pat. No. 3,758,358 dated Sep. 11, 1973 to Kuroda, U.S. Pat. No. 3,783,156 dated Jan. 1, 1974 to Kuroda, U.S. Pat. No. 3,843,437 dated Oct. 22, 1974 to Robinson, U.S. Pat. No. 3,855,043 dated Dec. 17, 1974 to Kuroda, U.S. Pat. No. 3,868,288 dated Feb. 25, 1975 to Ercolano, U.S. Pat. No. 3,944,454 dated Mar. 16, 1976 to Burgheimer, and U.S. Pat. No. 4,157,272 dated Jun. 5, 1979 to Kuroda, the disclosures of which are hereby incorporated by reference in their entirety.

Various kinds of inflatable devices have also been known, and include inflatable holiday decorations as disclosed in U.S. Pat. No. 4,226,902 dated Oct. 7, 1990 to Webb. However, heretofore inflatable appliques have not been attached to clothing articles. In some instances clothing articles have been inflatable in their entirety, such as in U.S. Pat. No. 1,803,898 dated May 5, 1931 to Diamond for a inflatable life preserver provided in a bathing suit, or in the inflatable muscle man shirt disclosed in U.S. Pat. No. 4,310,927 dated Jan. 19, 1982 to DeBose.

SUMMARY OF THE INVENTION

It is an object of the present invention to provide an inflatable applique on an article fabric in order to create a three dimensional object that stands out from the clothing. It is a further object of the invention to provide a method of manufacturing such a inflatable applique and to apply it to an article of clothing with a minimum of manufacturing steps.

In accordance with an embodiment of the invention, an inflatable applique for an article of clothing comprises an article of clothing; an air impervious backing layer of polymeric material having a desired decorative peripheral outline and being generally affixed to the clothing at least along its outer peripheral portion; and an air impervious top layer of flexible polymeric material having a peripheral outline that is complementary to the peripheral outline of the backing layer. The top layer is sealed to the backing layer along its outer peripheral zone, so that the top layer and backing layer form a substantially airtight inflatable enclosure securely affixed to the clothing. Valve means are attached to the enclosure so that it can be inflated to project from the clothing and create a three dimensional object defined by the enclosure. In another embodiment, the inflatable applique is affixed to a fabric article such as a beach towel or a blanket, so that the applique can serve as a permanently affixed pillow on which a person may rest his head or on which he may sit.

Preferably, the backing layer peripheral portion is affixed to the fabric article by its penetration into interstices of the fabric article caused by softening of the backing layer. To improve the affixation of the backing layer of the enclosure to the fabric article, an additional layer placed on the opposite side of the clothing from the backing layer may be used, with the backing layer welded to the additional layer. Where the top and backing layers have substantially similar peripheral outlines, the peripheral zone of the top layer is affixed to the backing layer peripheral portion.

The valve may be affixed to either the top or backing layers of the enclosure. The backing layer may be flexible, or it may be rigid, so that the three dimensional object defined by the enclosure stands out more dramatically from the clothing.

The enclosure is preferably located on an outer surface of the clothing so that it projects outwardly, however, it may also be placed on an inner surface of the clothing so that it projects inwardly.

Various decorative elements may be applied to the top layer, and may include a printed design, an embossed design, or a transparent pocket. Where an embossed design is desired, it may be applied directly to the top layer, or by using a embossed cover layer which is affixed to the top layer around a perimeter of the embossed design and in predetermined locations within the perimeter of the embossed design. If desired, a resilient compressible material may also be located between the cover and top layers to enhance the raised portions of the embossed design.

The top layer may be affixed to the backing layer at predetermined locations within the peripheral outline of the top layer to form one or more subenclosures operably connected to the main enclosure. These subenclosures are inflatable together with the main enclosure, and give the applique a sculpted appearance useful to highlight various elements of the design of the applique.

Typically, the top layer has a peripheral outline which is substantially similar to the peripheral outline of the backing layer, however, if desired, the backing layer may have a greater circumferential length than the top layer.

If desired, the top layer may also be provided with an extending chamber operably connected to the main enclosure which is inflatable with the enclosure but detached from the clothing and free to bob up and down.

A method of manufacturing an inflatable applique for an article of clothing comprises the steps of affixing a valve to an air impervious top or backing layer of a polymeric material; affixing the backing layer to the clothing article; sealingly affixing the top layer to the backing layer at least around a peripheral zone of the top layer to form a substantially airtight inflatable enclosure that defines a three dimensional object; cutting the top and backing layers to provide the top and backing layers with complementary peripheral outlines; and separating excess top and backing layers from around the perimeter of the enclosure.

The step of affixing the top layer to the backing layer preferably comprises a welding step using a welding die, and the step of cutting the top and backing layers preferably occurs at substantially the same time as the welding step. The cutting step in such case is performed by an outline cutting edge provided in the welding die. Most preferably, the step of affixing the backing layer to the clothing article occurs substantially at the same time as the steps of welding the top layer to the backing layer and cutting the the top and backing layers, the step of affixing the backing layer to the clothing comprising applying sufficient energy and pressure by the welding die to at least a peripheral portion of the backing layer to soften the peripheral portion sufficiently to cause the peripheral portion of the backing layer to penetrate interstices in the clothing article.

A further step of welding selected portions of the top layer to the backing layer at locations within the peripheral outline of the top and backing layers to provide the enclosure with an inflatable three dimensional subenclosure may also be provided.

An additional step of welding an additional layer of a soft flexible flexible polymeric material to the backing layer with the clothing therebetween, simultaneously with the welding of the backing layer to the clothing may also be taken to provide additional strength to the affixation of the enclosure to the clothing.

Where a one piece valve is used, the step of affixing the valve may comprise cutting an aperture sized to be contained within the valve base in one of the top and backing layers and welding the base of the valve to one of the top and backing layers with the base surrounding and containing the aperture. Where a two piece valve is used, one valve piece is the valve stem and base, and the other is the valve backing. Where the two piece valve is affixed to the top layer, an aperture is cut in the top layer, the valve backing is located on one side, and the valve base on the other, and the two pieces are welded together with the top layer therebetween. Where the valve is to be affixed to the backing layer, the steps of affixing the two piece valve may comprise cutting an aperture sized to be contained within the valve base in the clothing; cutting an aperture sized to be contained within the valve base in the backing layer; locating the backing layer against the clothing with the apertures in the clothing and backing layers in alignment; locating the valve backing adjacent the backing layer with the valve backing surrounding and containing the backing layer aperture; locating the valve stem and base adjacent the clothing with the valve base surrounding and containing the clothing aperture; fitting the valve stem and base together with the valve backing to sandwich portions of the backing layer and the clothing located adjacent the apertures between the valve base and valve backing; and welding the valve base to the backing layer and to the valve backing whereby the valve is affixed to the backing layer and the clothing.

Other objects, aspects and features of the present invention in addition to those mentioned above will be pointed out in detail or will be understood from the following detailed description provided in conjunction with the accompanying drawings.

DETAILED DESCRIPTION OF THE DRAWINGS

DESCRIPTION OF THE PREFERRED EMBODIMENT

Figure 1:
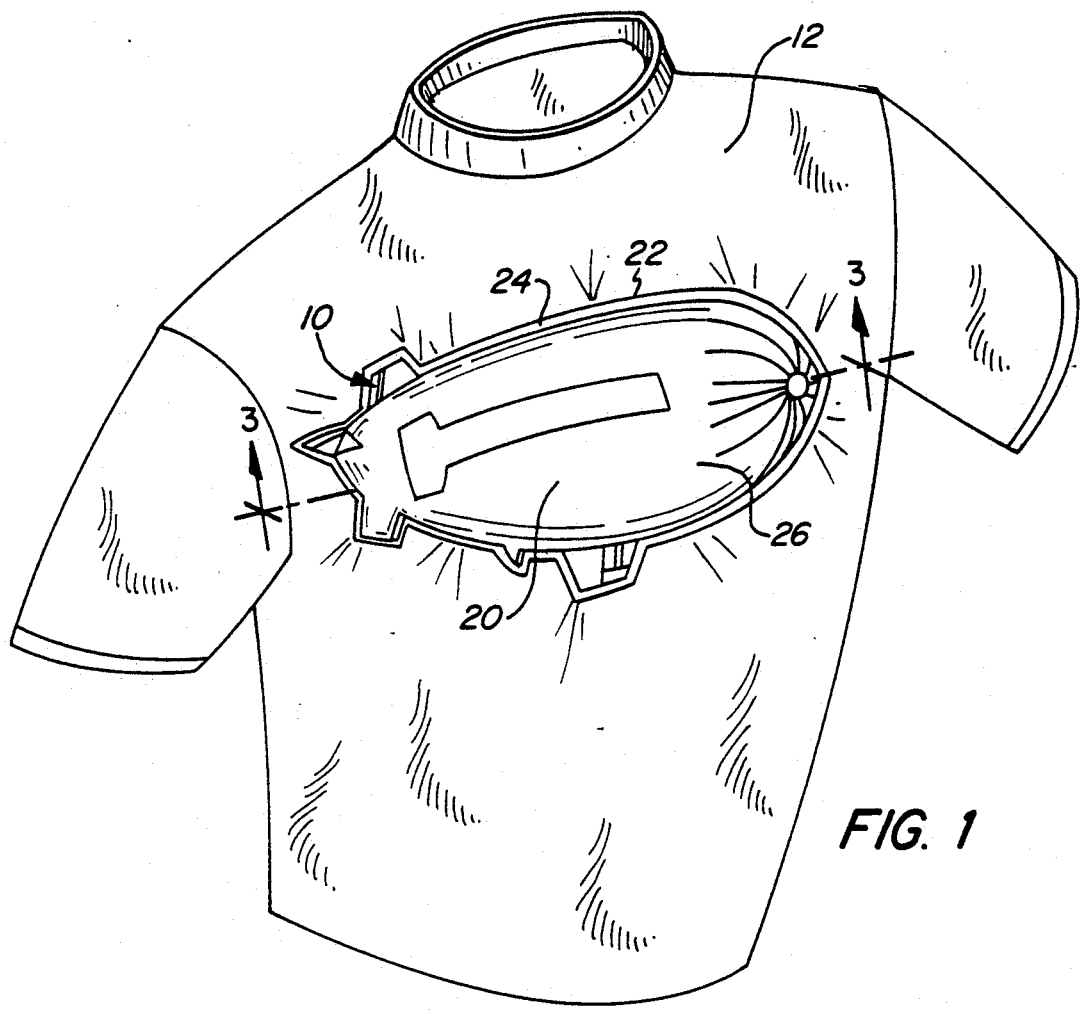
FIG. 1 is a perspective view of a first embodiment of an inflatable applique for an article of clothing in accordance with the invention.

"Clothing" as used herein includes shirts, T-shirts, sweatshirts, sweatpants, hats, jackets, coats, pants, shorts and any other article adapted to be worn.

"Polymeric" materials as used herein includes vinyl materials such as vinyl sheeting, expanded vinyl, supported vinyl, neoprene compounds, polypropylene, polyethylene, polyesters, nylons, polyamides, rubber and rubber compounds, and all other synthetic materials useful in the products and processes described in this application. However, in most situations, vinyl sheet products will be preferred, as they are simpler to use and process, and are available in a wide variety of useful embodiments, including opaque, transparent, clear, frosted and reflective. Vinyl is also preferred for its ability to receive a wide variety of decorative designs through painting, printing, or embossing.

In the drawings, like numbered elements are to be considered to be the same elements as shown and described in reference to other drawings.

Figure 2:
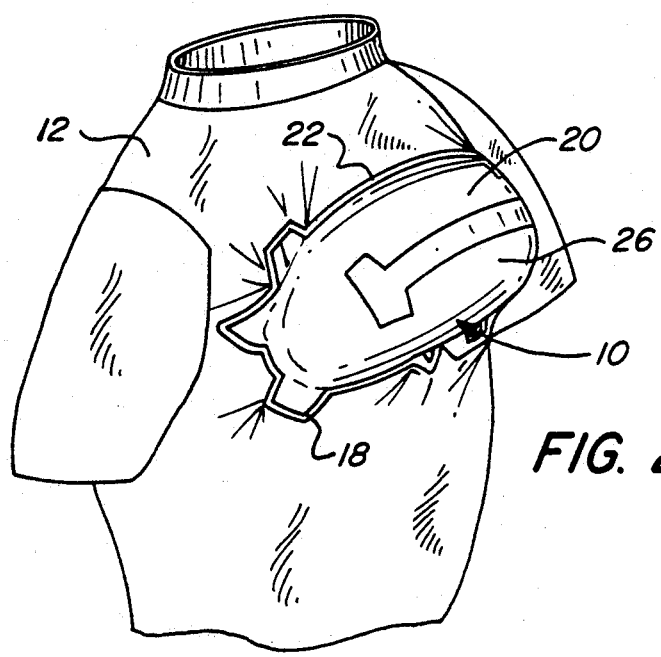
FIG. 2 is a side perspective view of the first embodiment of an inflatable applique for an article of clothing of FIG. 1.
Figure 3:
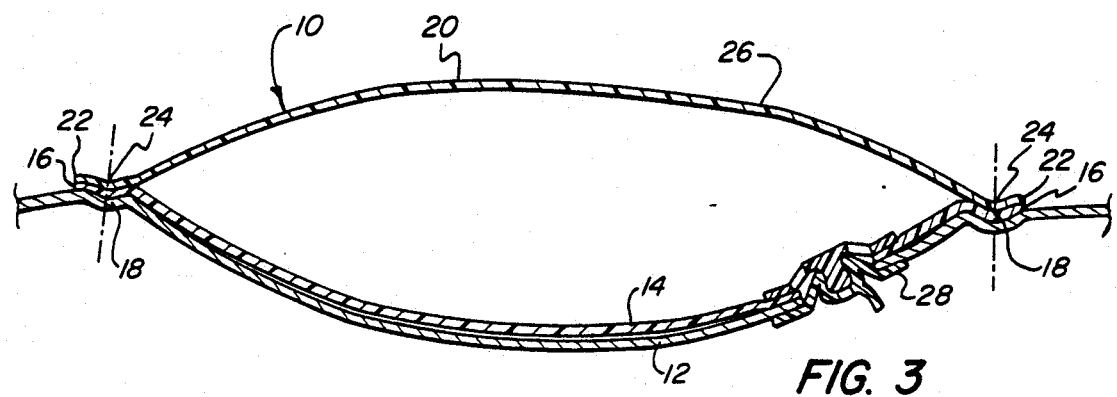
FIG. 3 is a cross sectional view of the inflatable applique for an article of clothing of FIG. 1 along the line 3—3 of FIG. 1.
Figure 2A:
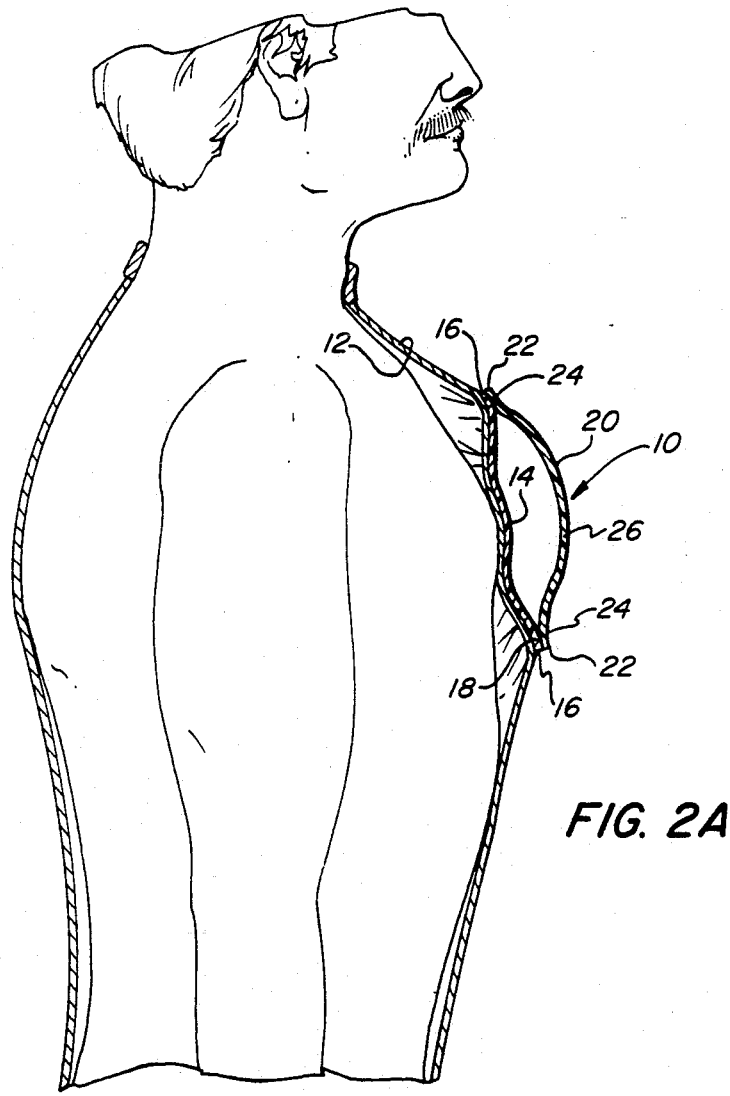
FIG. 2A is a side cross-sectional view of the first embodiment of an inflatable applique for an article of clothing of FIG. 1.

Referring now to FIGS. 1-4, a inflatable applique 10 for an article of clothing 12 is shown. Applique 10 includes an air impervious backing layer 14 of polymeric material having a desired decorative peripheral outline 16. Backing layer 14 is affixed to the clothing 12 at least along its outer peripheral portion 18 located inwardly from and adjacent the peripheral outline 16. An air impervious top layer 20 of flexible polymeric material has a peripheral outline 22 that is complementary to the peripheral outline 16 of the backing layer 14. The top layer 20 is sealed to the backing layer 14 along the outer peripheral zone 24 of the top layer, which is located inwardly from and adjacent the peripheral outline 22. The top layer 20 and backing layer 14 form a substantially airtight inflatable enclosure 26 which is securely affixed to the clothing 12. A valve 28 is attached to the enclosure 26 so that can be inflated to project from the clothing 12 and create the appearance of a three dimensional object defined by the enclosure 26 and particularly by the the peripheral outline 22 of the top layer 20. In the embodiment shown in FIGS. 1-4, the valve 28 is affixed to the backing layer 14 and extends through the clothing 12. The valve is thus hidden from view when the clothing 12 is worn. In the case of FIG. 1, the three dimensional object represented is a blimp. In this case, the enclosure 26 is located on the outer surface of the clothing 12. Also, the backing layer 14 has a peripheral outline 16 that matches and is substantially similar to the peripheral outline 22 of the top layer 20. The backing layer 14 in FIG. 1 is a flexible material, so that it will tend to expand both inwardly and outwardly from a plane defined by the join between the backing layer 14 and the top layer 20, as seen in FIG. 3. However, when the inflatable applique 10 and clothing 12 is worn, the person's body pushes the applique outwardly so that it will have an eye-catching three-dimensional impact, as seen in FIGS. 2 and 2A.

Figure 6:
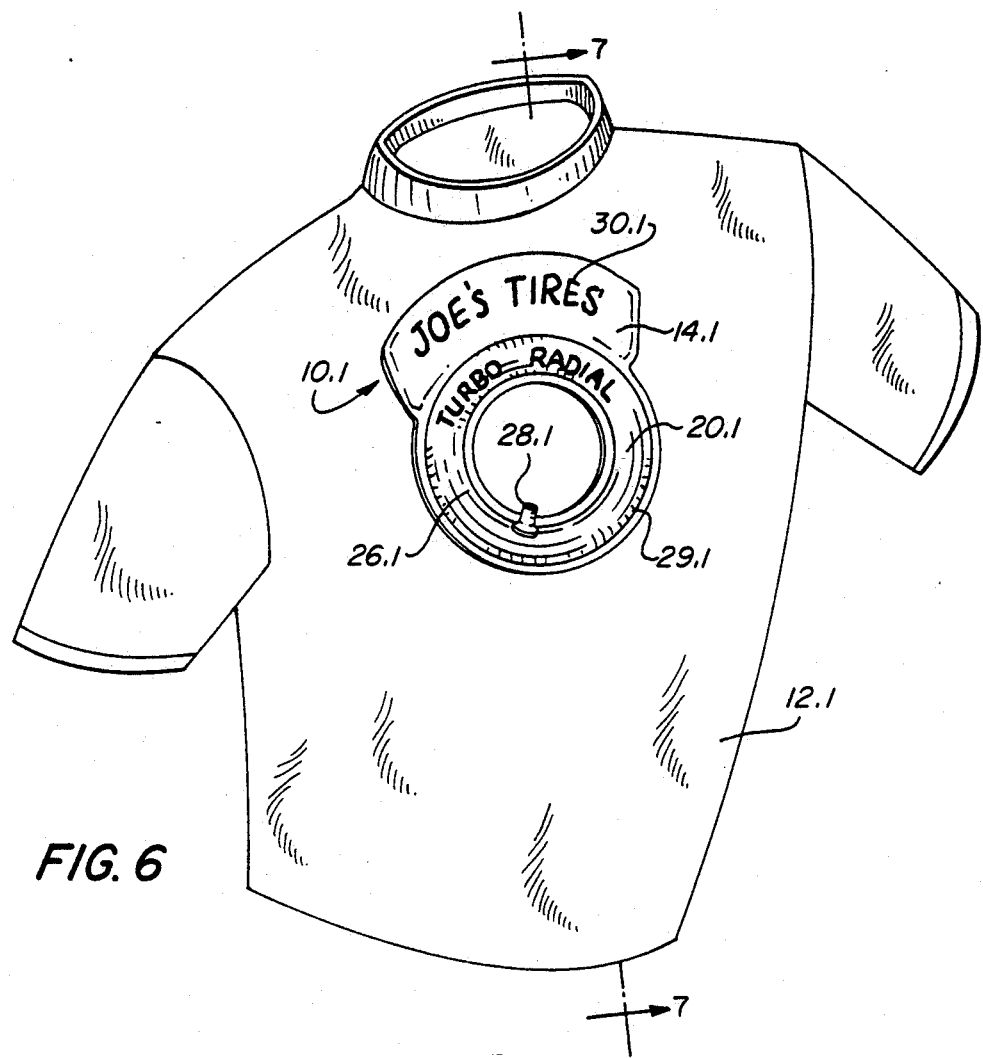
FIG. 6 is a perspective view of a second embodiment of an inflatable applique for an article of clothing in accordance with the invention.
Figure 7:
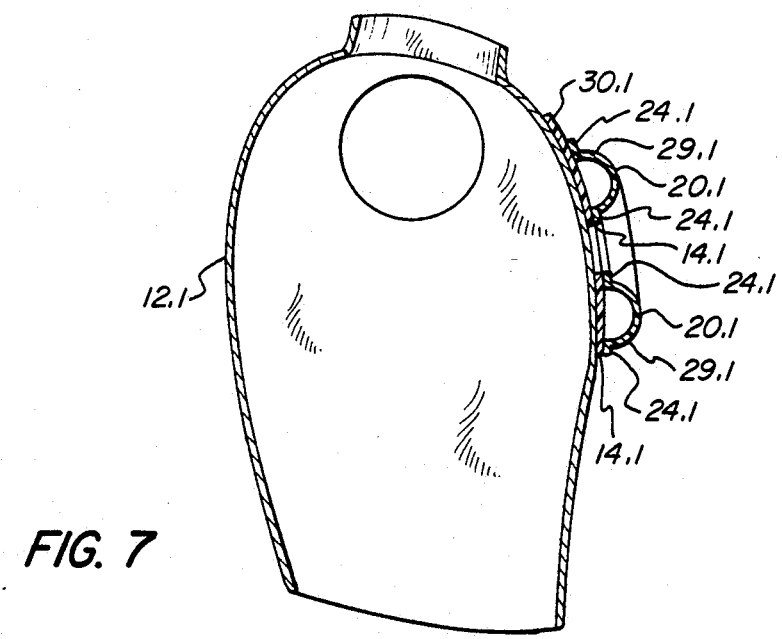
FIG. 7 is a cross sectional view of the second embodiment of an inflatable applique for an article of clothing of FIG. 6.

In a second embodiment of an applique 10.1 and clothing article 12.1, as shown in FIGS. 6 and 7, the backing layer 14.1 may be formed of a more rigid material than the top layer 20.1, so that the applique 10.1 will stand out from the clothing article 12.1 without needing to be supported by the wearer's body. This provides a substantial visual impact of the three dimensional object defined by the enclosure 26.1, which in FIGS. 6 and 7 is shown as a tire. The second embodiment of the applique 10.1 shows a valve 28.1 affixed to the top layer 20.1 of the enclosure 26.1. FIGS. 6 and 7 also show an applique 10.1 with a backing layer 14.1 which has a circumferential length which is larger than the circumferential length of the top layer 20.1, leaving an extending sheet 30.1 of polymeric material available for printing or application of other decorative devices. This may be used in a variety of ways, for example, the enclosure could be a three dimensional sandwich, and the extending sheet, which may extend in more than one direction, could be a representation of a napkin bearing the name of a restaurant. The rigid backing layer 14.1 will typically be thicker than the flexible top layer 20.1, and it may be necessary to supplement the various affixation and welding techniques as set forth hereafter with a film of adhesive to adhere the rigid backing layer 14.1 to the clothing 12.1.

Figure 8:
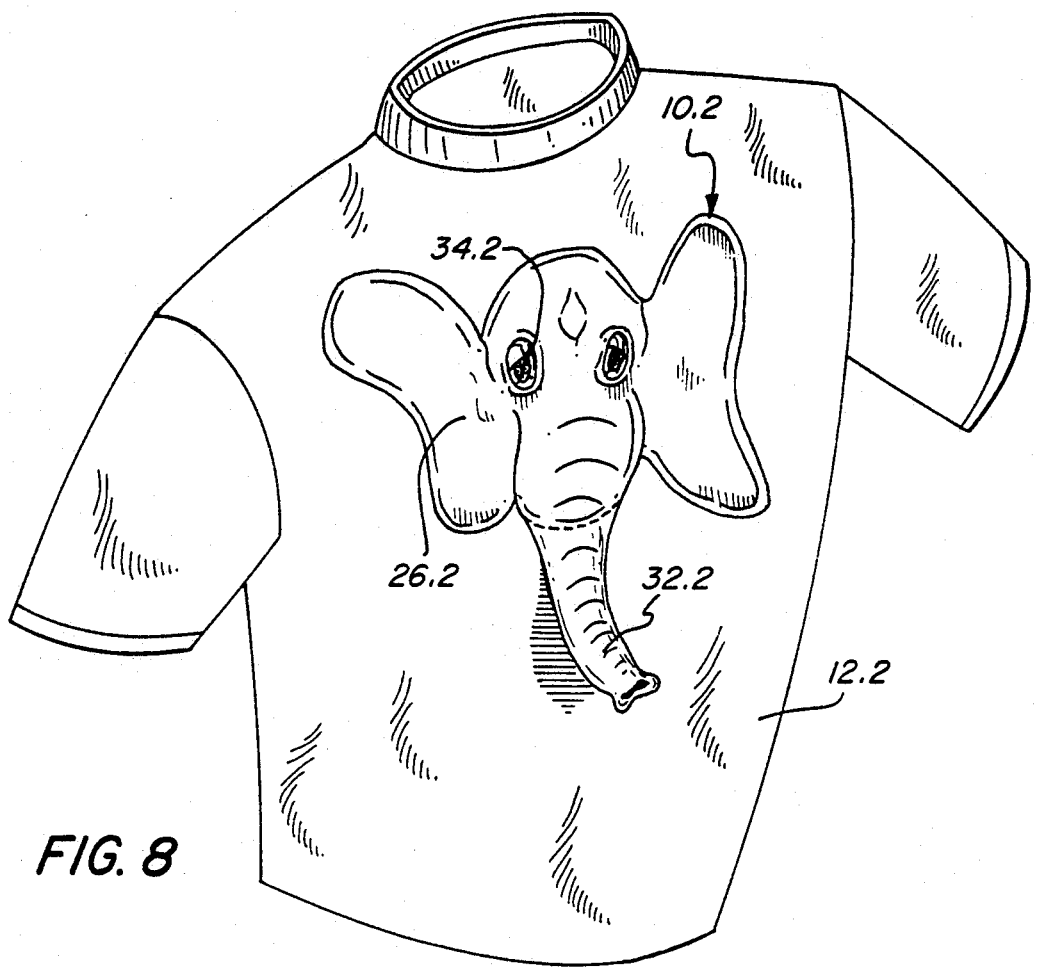
FIG. 8 is a perspective view of a third embodiment of an inflatable applique for an article of clothing with an extending chamber in accordance with the invention.
Figure 9:
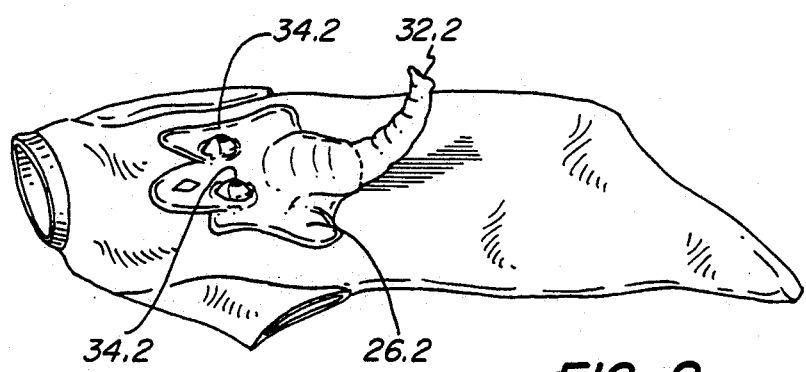
FIG. 9 is another perspective view of the third embodiment of an inflatable applique for an article of clothing of FIG. 8.

Referring now to FIGS. 8 and 9, a third embodiment of an applique 10.2 and clothing article 12.2 is shown. In this embodiment, the enclosure 26.2 comprises top and backing layers and a valve as described in reference to the other embodiments, and is provided with an extending chamber 32.2. The three dimensional object represented in FIGS. 8-9 is an elephant and the extending chamber 32.2 is the elephant's trunk. The extending chamber 32.2 is not directly attached to the clothing 12.2, but is rather attached to the top layer 20.2, and is in communication with the enclosure 26.2 so that inflation of the enclosure 26.2 will also cause inflation of the extending chamber 32.2. The extending chamber 32.2 may of course take a variety of forms, and might, for example be the two side areas of a bow tie, or the ears of an animal cartoon character. The embodiment of FIGS. 8 and 9 also includes two subenclosures 34.2. Subenclosures 34.2 in FIGS. 8 and 9 are representations of the elephant's eyes, and are formed by the welding of the top layer 20.2 to the backing layer 14.2 within the peripheral outline of the top layer 20.2, in this example, around a substantial portion of the circumference of a circle to give a circular eye shape. The subenclosures 34.2 are in communication with the enclosure 26.2 so that inflation of the enclosure 26.2 will also cause inflation of the subenclosures 34.2. This gives the three dimensional object-a sculpted appearance that emphasizes the objects represented by the subenclosures 34.2.

The foregoing embodiments are only intended to be illustrative of the invention, as the inflatable applique may take any number of shapes and sizes, and could for example, be representative sporting equipment, such as basketballs, footballs, soccer balls, baseballs or baseball bats, jogging shoes etc. The applique might be representative of consumer products, such as bottles of cola, automobiles, food products, etc. The applique might be representative of animals or cartoon characters. In addition, various decorative elements may be applied to the top layer of the applique, and may include a printed design, an embossed design, or a transparent pocket.

Where a design is printed on the top layer of the applique, it will be necessary to insure precise registration of the printed design with the peripheral outline of the top layer and/or the shape of subenclosures so that the peripheral outline and the outlines of the subenclosures will complement the printed design.

Where an embossed design is desired, the embossment may be applied directly to the top layer, for example, in FIGS. 6 and 7, a tire tread might be embossed in the outer areas 29.1 of the top layer 20.1. An embossed design might also be made on a separate embossed cover layer which is affixed to the top layer around a perimeter of the embossed design and in predetermined locations within the perimeter of the embossed design, as disclosed in the patents to Kuroda, previously incorporated by reference. A resilient compressible material may also be located between the cover and top layers to enhance the raised portions of the embossed design, also as disclosed in the previously incorporated by reference patents to Kuroda.

A transparent cover layer may alternatively be affixed to the top layer to form a pocket with a transparent face, and the pocket may containing a decorative element visible through the transparent cover layer. For example, the pocket might contain a decorative element such as plastic novelties, trinkets, or a liquid representative of a beverage.

Figure 10:
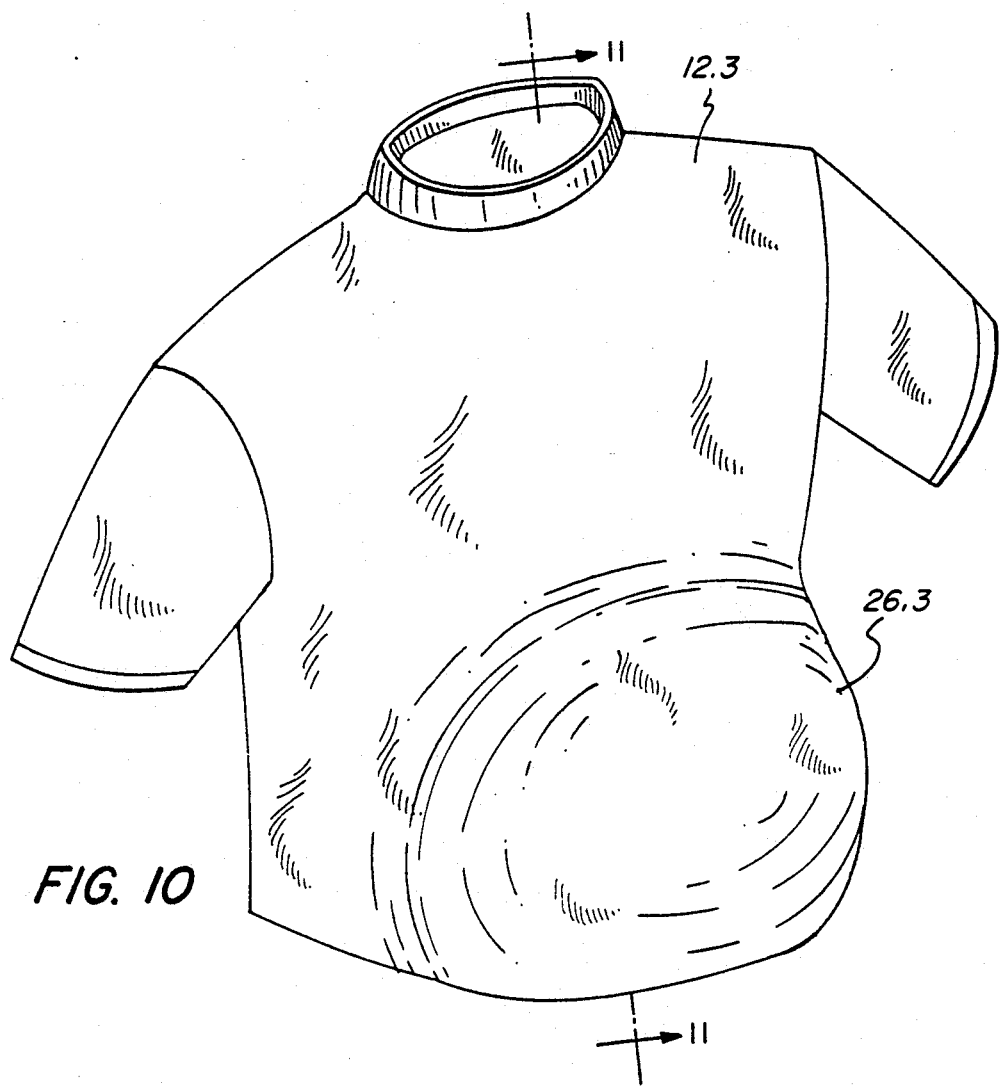
FIG. 10 is a perspective view of a fourth embodiment of an inflatable applique for an article of clothing in accordance with the invention.
Figure 11:
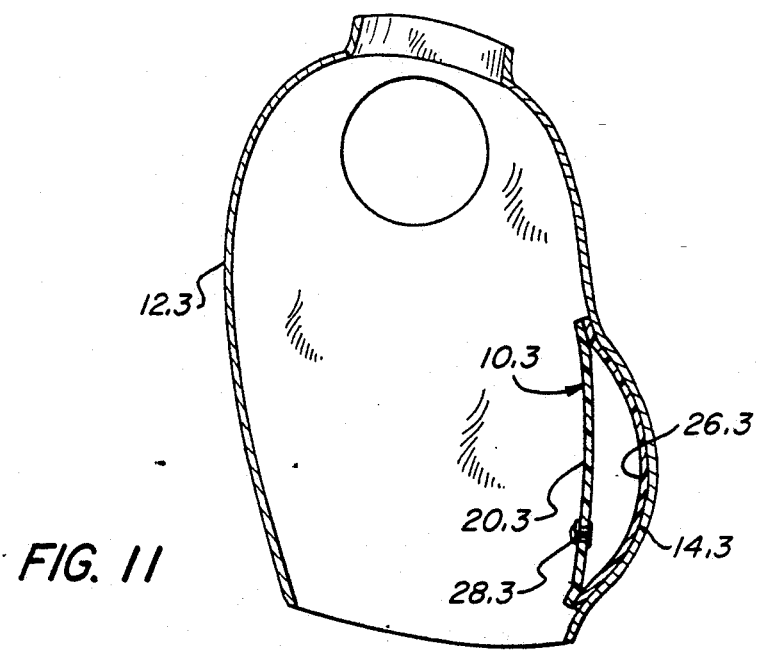
FIG. 11 is a cross sectional view of the fourth embodiment of an inflatable applique for an article of clothing of FIG. 10.

In some instances, it may be desirable to locate the applique on the inner surface of the clothing. For example, in the fourth embodiment shown in FIGS. 10 and 11, an applique 10.3 comprising an enclosure 26.3 formed of a backing layer 14.3 and a top layer 20.3 is located on an inner surface of a clothing article 12.3. The enclosure 26.3, when inflated through valve 28.3, gives the wearer of the inflatable applique and clothing 12.3 the appearance of being pregnant, and would for example, be used as gift to an expectant father.

Figure 22:
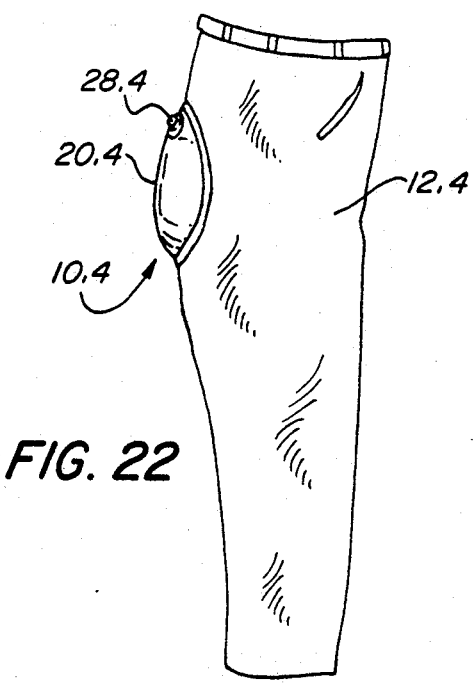
FIG. 22 is a side elevation view of the embodiment of FIG. 21.
Figure 21:
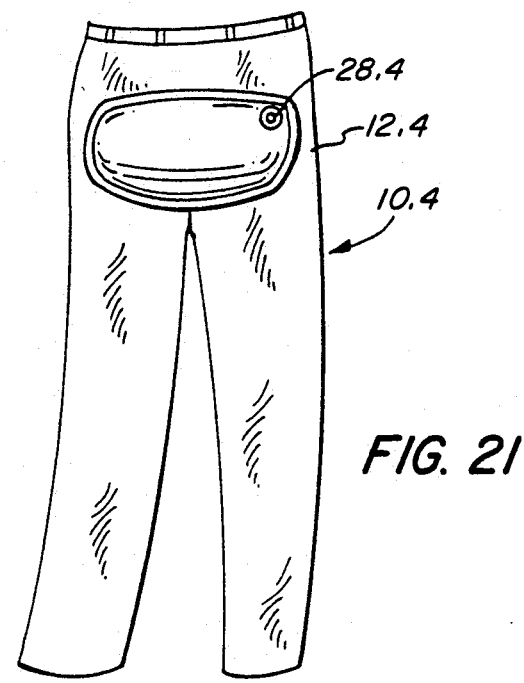
FIG. 21 is a plane view of a fifth embodiment of an inflatable applique for an article of clothing in accordance with the invention.

Another application of the invention is shown in FIGS. 21 and 22, which disclose an inflatable applique 10.4 affixed to a pair of pants 12.4. Although the applique 10.4 is shown on the outer surface of the pants 12.4, it could also be located on the inner surface. In addition, instead of a single applique 10.4, there could be two separate such appliques, one for each buttock. The embodiment shown in FIGS. 21 and 22 provides a comfortable cushion, which cannot be forgotten, for spectators sitting on the usually uncomfortable bleachers or seats at a sporting or other event.

Figure 4:
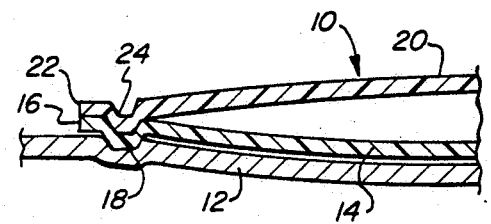
FIG. 4 is a detail of the cross sectional view of FIG. 3 showing the penetration of a backing layer into the interstices of the clothing.

Referring now to FIGS. 2A, 3, and 4, the affixation of the the backing layer peripheral portion 18 to the clothing 12 is achieved by the penetration of the peripheral portion 18 into interstices of the clothing 12. This is achieved through softening of the backing layer 14 and application of pressure as set forth in more detail hereafter. To improve the affixation of the backing layer 14 of the enclosure 26 to the clothing 14, an additional layer of a polymeric material may be placed on the opposite side of the clothing from the backing layer, and the backing layer is welded to the additional layer with the clothing 12 therebetween. Such an additional layer as described is shown as 36 in the exploded view of the manufacturing method shown in FIG. 17. The additional layer 36 may also have a layer of fabric laminated to it on the side of the additional layer which will be worn against a person's skin, to improve the wearer's comfort.

Where the top and backing layers have substantially similar peripheral outlines as do the top layer 14 and backing layer 20 of FIGS. 1-4, the peripheral zone 24 of the top layer will be affixed to the peripheral portion 18 of the backing layer 14.

Where the top and backing layers have different peripheral outlines, for example, in FIGS. 6 and 7, the top layer 20.1 is annular while the backing layer 14.1 is annular with an extending sheet 30.1, the peripheral zone 24.1 of the top layer will be affixed to the adjacent portions of the backing layer 14.1.

The valve may be affixed to either the top or backing layers of the enclosure. For example, in FIGS. 3, the valve 28 is affixed to the backing layer 14 of the applique 10. In contrast, in FIG. 6, the valve 28.1 is located on the top layer 20.1 of the applique 10.1.

Referring now to FIGS. 1-5, and 15-17, a method of manufacturing an inflatable applique 10 for an article of clothing 12 comprises the steps of affixing a valve 28 to an air impervious top or backing layer 20 or 14 of a polymeric material; affixing the backing layer 14 to the clothing article 12; sealingly affixing the top layer 20 to the backing layer 14 at least around a peripheral zone 24 of the top layer 20 to form a substantially airtight inflatable enclosure 26 that defines a three dimensional object; cutting the top and backing layers 20 and 14 to provide the top and backing layers with complementary peripheral outlines 22 and 16; and separating excess top and backing layers from around the perimeter of the enclosure 26.

The method of affixation of the valve to the enclosure, of the top layer to the backing layer, and the backing layer to the clothing in all cases preferably comprises a welding method. Welding may be achieved by a die adapted to heat the applique components and press against them. The heating can be achieved by radio frequency heating or ultrasonic heating in which dielectric fields or ultrasonic fields are created by the the die elements, or by a direct application of a heated die against the applique components.

Figure 15:
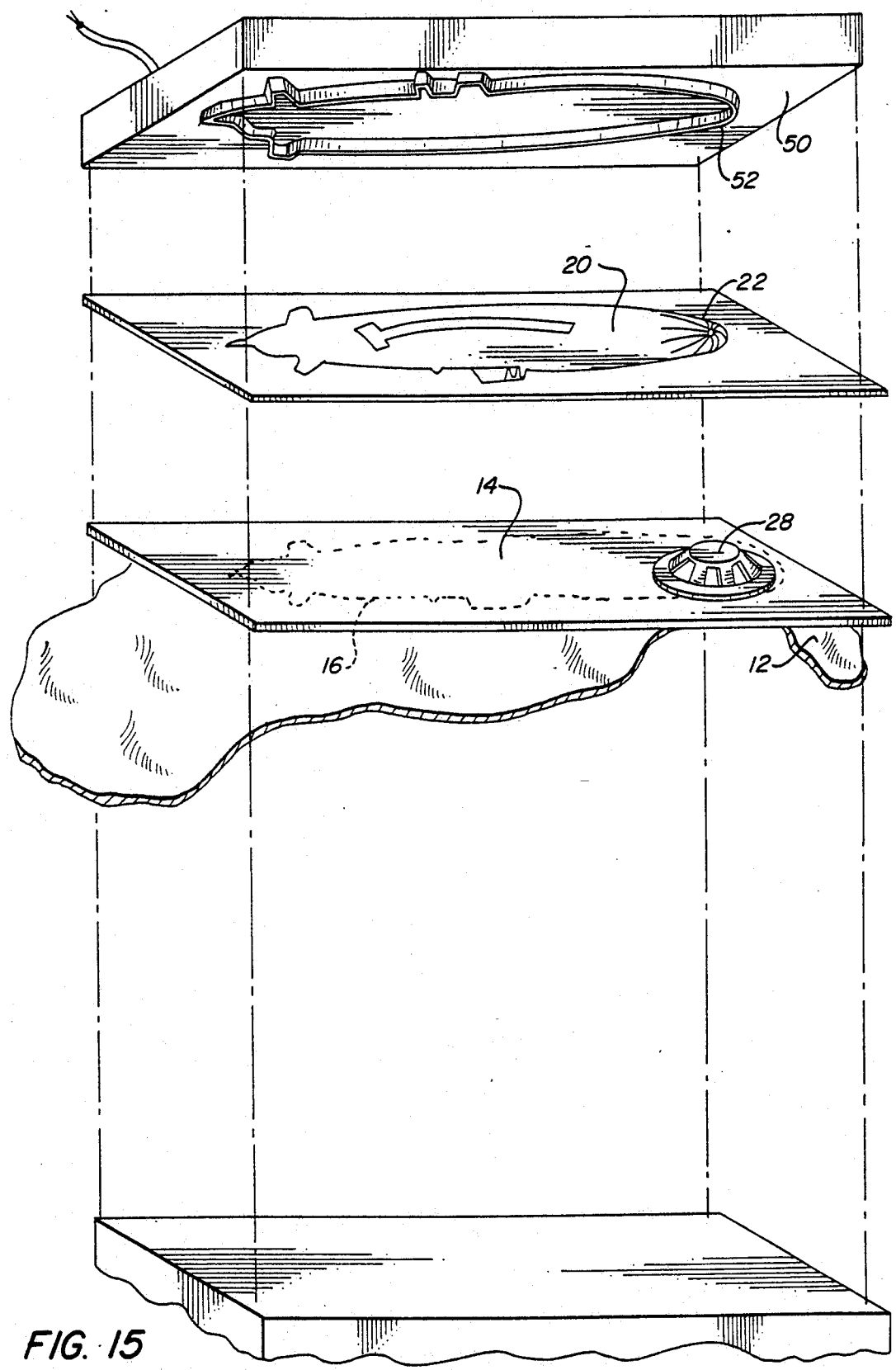
FIG. 15 is an exploded view showing a step of affixing top and backing layers together to form an enclosure, and affixing the enclosure to a clothing article in a method of manufacturing the inflatable applique for an article of clothing of FIG. 1.
Figure 18:
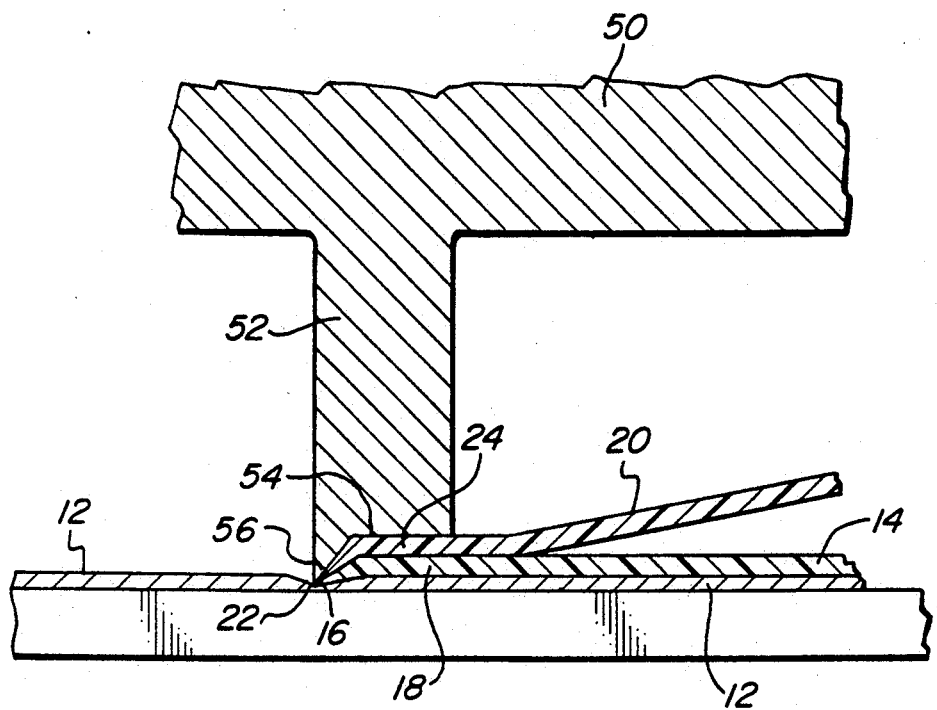
FIG. 18 is a detail view of the welding and cutting edges of a welding die used in a method of manufacturing an inflatable applique for an article of clothing.

Referring to FIG. 15, in the preferred embodiment, the steps of welding the top layer 20 to the backing layer 14, and the backing layer 14 to the clothing 12, and the step of cutting the peripheral outlines 22 and 16 of the top and backing layers 20 and 14 preferably occur substantially simultaneously. This is achieved by a peripheral sealing and cutting die 50 which is provided with the sealing and cutting edge 52. Referring to the detail view of the sealing and cutting edge 52 shown in FIG. 18, it is apparent that the peripheral zone 24 of the top layer is welded to the peripheral portion 18 of the backing layer 14 by the die sealing area 54, and the peripheral outlines 16 and 22 of the top and backing layers are cut by cutting edge 56, so that excess top and backing layers may be readily peeled away from the applique which is affixed to the clothing.

However, it is also possible to perform separate assembly steps, in which the backing layer 14 is first welded to the clothing 12, and the top layer 20 is subsequently welded to the backing layer 14. Alternatively, the backing layer 14 may first be welded to the top layer 20, and they may both be welded to the clothing 12. Where a cover layer such as an embossed cover layer as disclosed by Kuroda is used, this will preferably be welded to the top layer 20 prior to assembly of the top layer 20 to the backing layer 14.

Figure 16:
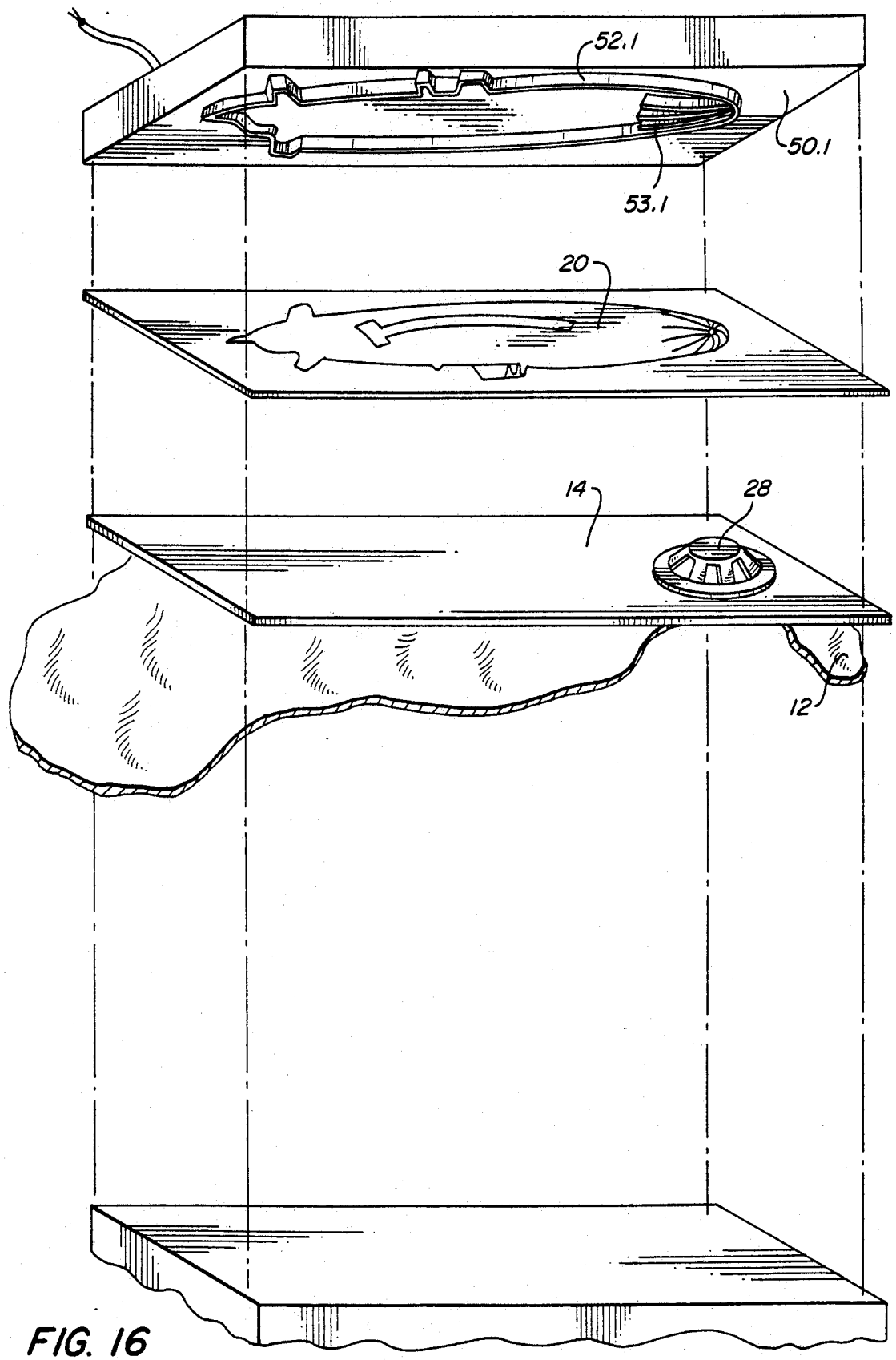
FIG. 16 is an exploded view showing a step of affixing top and backing layers together to form an enclosure and to form inner weld lines to make a subenclosure to form a clothing article in accordance with a method of manufacturing an inflatable applique and article of clothing similar to that of FIG. 1 but adding additional subenclosures.
Figure 19:
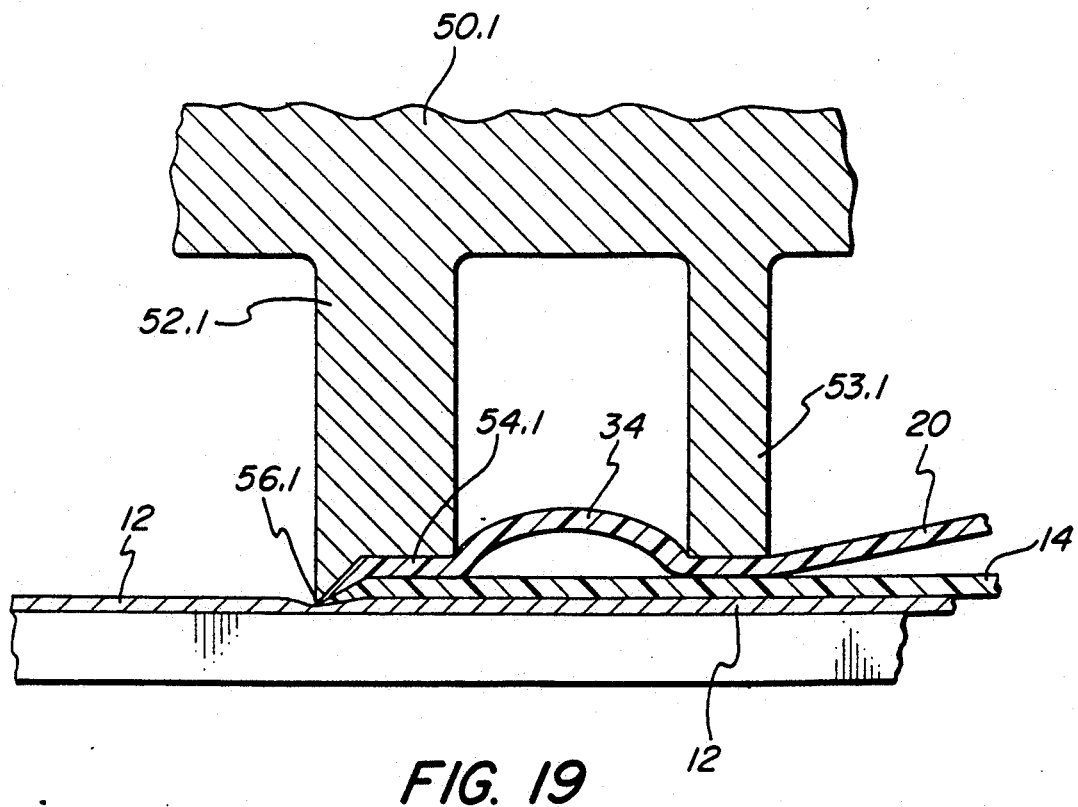
FIG. 19 is a detail view of the welding and cutting edges spaced apart from an inner weld edge of a welding die used to make an enclosure and subenclosure in a method of manufacturing an inflatable applique for an article of clothing.

Referring now to FIG. 16, a further step of welding selected portions of the top layer 20 to the backing layer 14 at locations within the peripheral outline of the top and backing layers to provide the enclosure with one or more inflatable three dimensional subenclosures is shown. In FIG. 16, the mold 50.1 is provided with both a peripheral sealing and cutting edge 52.1 as described in reference to FIG. 18, as well as an internal weld edge 53.1 or a plurality of such edges. In FIG. 16, the internal weld edge 53.1 would provide separated puffy subenclosures which would be located at the forward portion of the blimp defined by the finished inflated applique 10 of FIG. 1. The same method would be used to provide the puffy eye portions 34.2 of the elephant defined by the enclosure 26.2 of FIGS. 8 and 9. Referring to FIG. 19, the die 50.1 is shown in greater detail. The internal sealing edge 53.1 seals together the top and backing layers 20 and 14 to form a sub enclosure 34. In the preferred embodiment, the internal sealing 53.1 edge may also seal the backing layer 14 to the clothing 12 simultaneously with the sealing together of the top and backing layers 20 and 14 and the welding of the backing layer 14 to the clothing 12. However, it is also possible to perform separate assembly steps, in which the backing layer 14 is first welded to the clothing 12, and the top layer 20 is subsequently welded to the backing layer 14 with the internal weld lines to form the subenclosures 34. Alternatively, the backing layer 14 may first be welded to the top layer 20, using a die which is adapted to form the subenclosures 34 only, and the top and backing layers 20 and 14 may be welded together and to the clothing 12 with a die having only a peripheral and cutting edge as described in reference to FIGS. 15 and 18.

Figure 20:
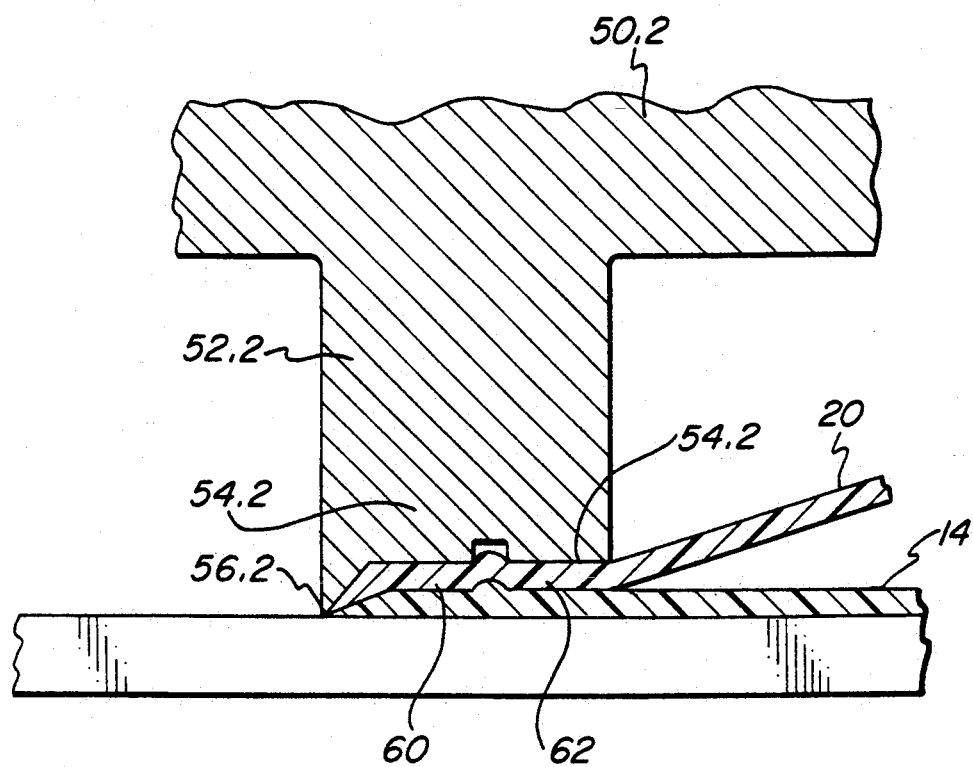
FIG. 20 is a detail view of the welding and cutting edges of a welding die used in a method of manufacturing an inflatable applique for an article of clothing with a wide border.

FIG. 20 shows a die 50.2 adapted to provide an enclosure with a double seal, extra wide border, which is useful for sewing of the applique onto a clothing article. Die 50.2 has a wide sealing edge, which may be divided into two sealing edges 54.2 as shown in FIG. 20, in order to provide a mold line between the inner and outer seals 62 and 60 formed by the die 50.2, as a guide for sewing the applique onto clothing.

Figure 17:
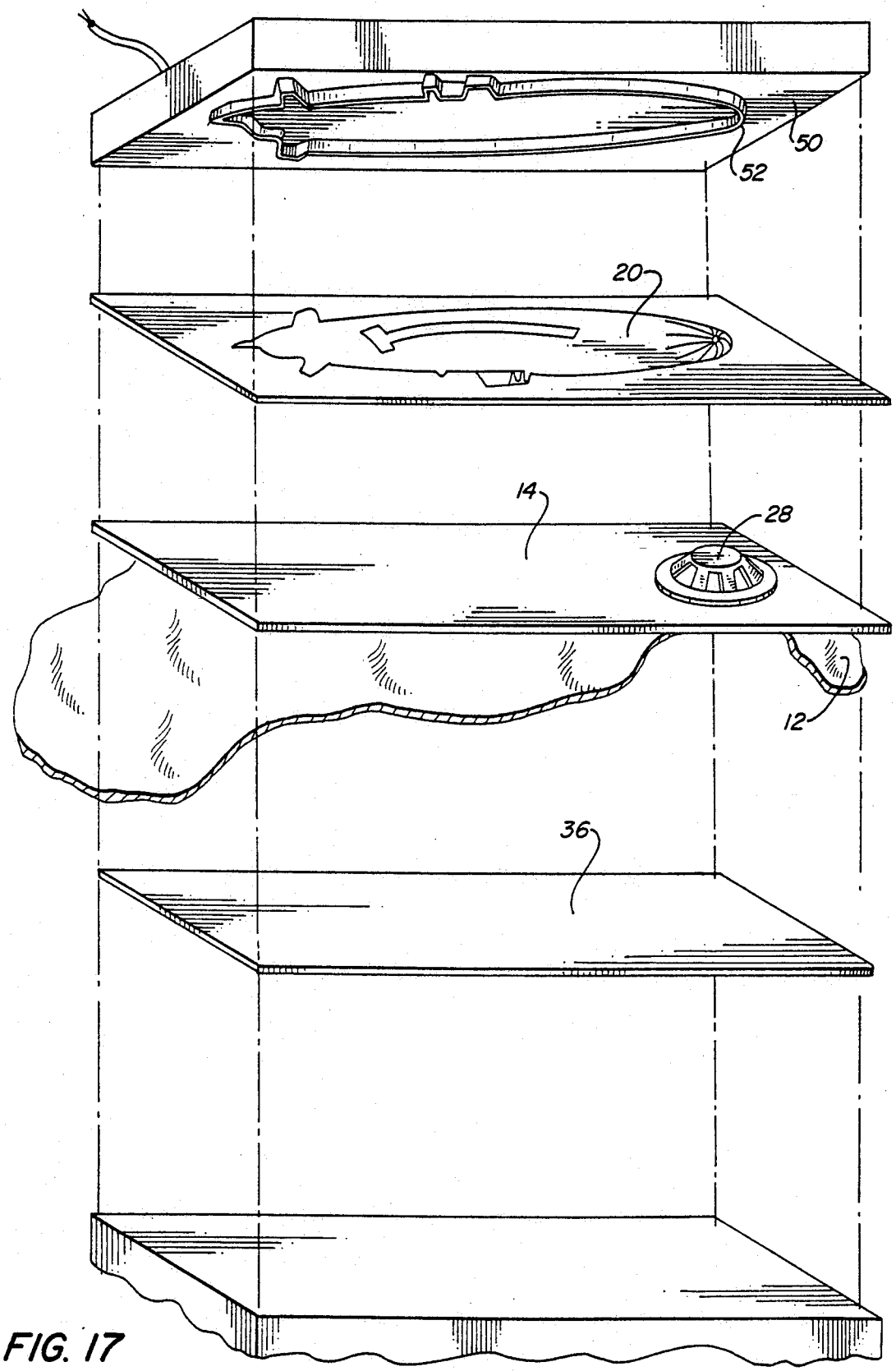
FIG. 17 is an exploded view showing a step of affixing top and backing layers together to form an enclosure, and affixing the enclosure to a clothing article with an additional layer opposite the backing layer with the clothing therebetween, in a method of manufacturing an inflatable applique for an article of clothing as in FIG. 1.

An additional step of welding an additional layer 36 of a soft flexible polymeric material to the backing layer with the clothing therebetween is shown in FIG. 17. As previously described, such a backing layer may in some circumstances be useful to provide additional strength to the affixation of the enclosure to the clothing This additional layer will usually be welded to the backing layer at the same time the backing layer is affixed to the clothing.

The step of affixing a valve to one of the top and backing layers will now be described. Preferably, the affixation of the valve will take place prior to final assembly of the applique layers together or to the clothing.

Figure 12:
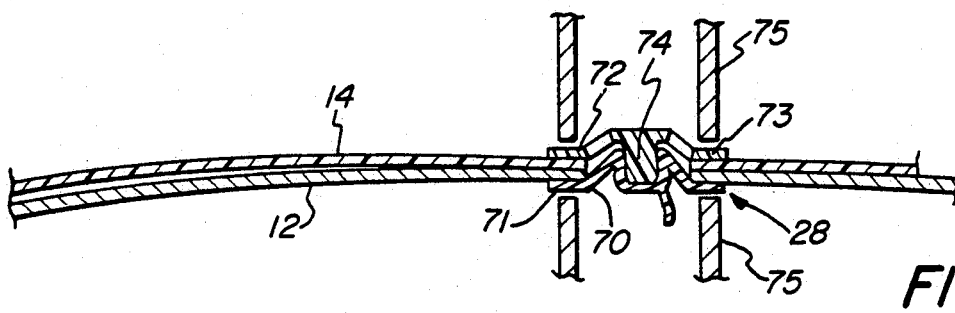
FIG. 12 is a cross sectional view showing a method of affixing a two piece valve to an enclosure layer.

Referring now to FIG. 12, a two piece valve 28 is shown in the step of being affixed to the backing layer 14 and clothing 20. Valve 28 includes a valve backing such as a flexible sealing annulus 70 and base piece such as a more rigid base piece 72 with a stem 74. Sealing annulus 70 may be moved from its sealed position shown in FIG. 12 to an unsealed position with the annulus 70 pulled away from the stem 74 to permit inflation of an enclosure. As previously mentioned, the valve may be affixed to either the top or backing layer. Where it is affixed to the backing layer, it is preferably also affixed to the clothing at the same time.

Figure 5:
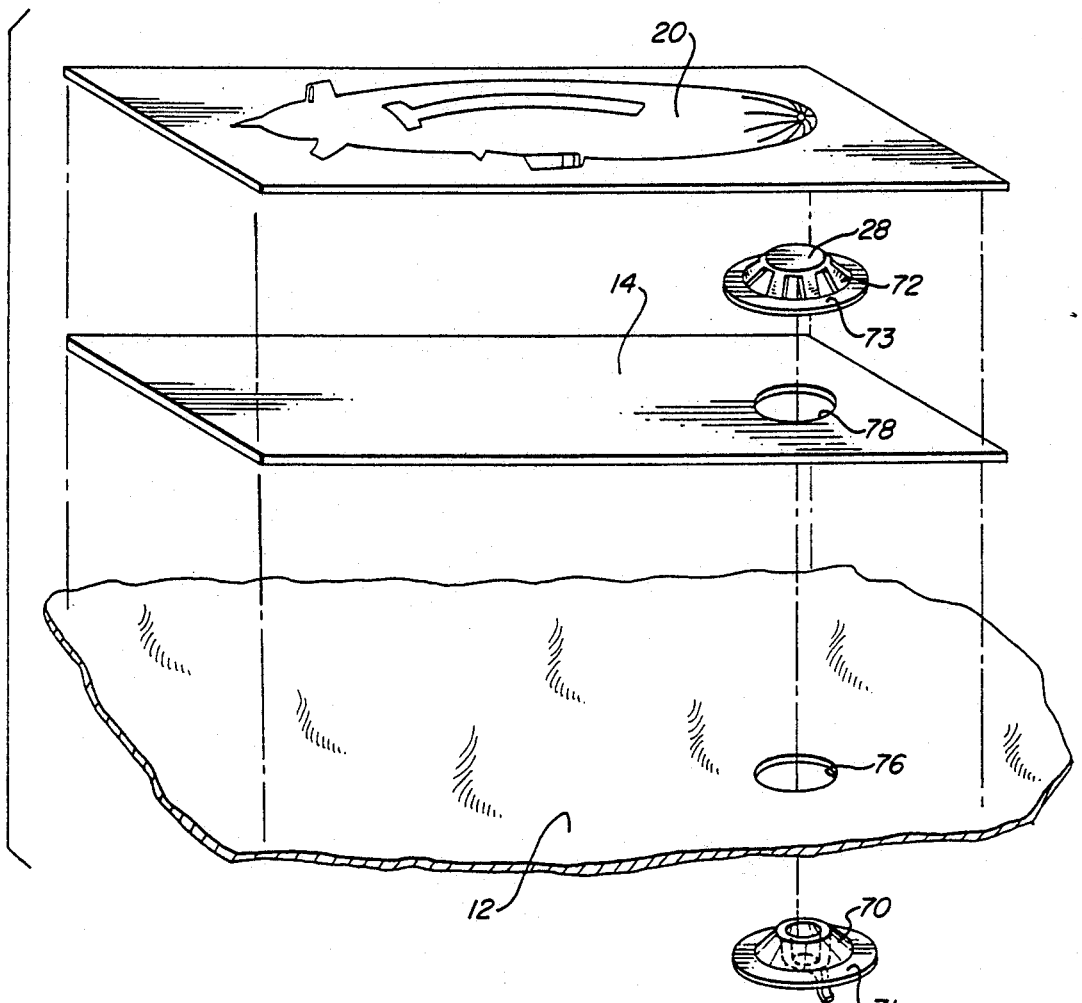
FIG. 5 is an exploded view of the inflatable applique for an article of clothing of FIG. 1 prior to cutaway of excess top and backing layers.
Figure 13:
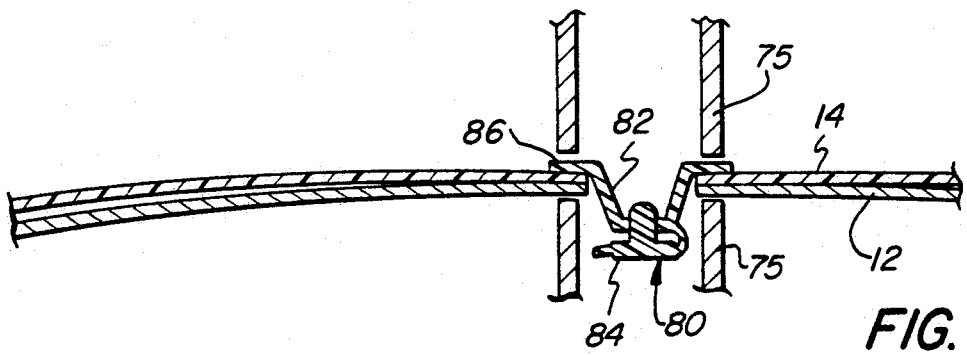
FIG. 13 is a cross sectional view showing a method of affixing a single piece valve to an enclosure layer.
Figure 14:
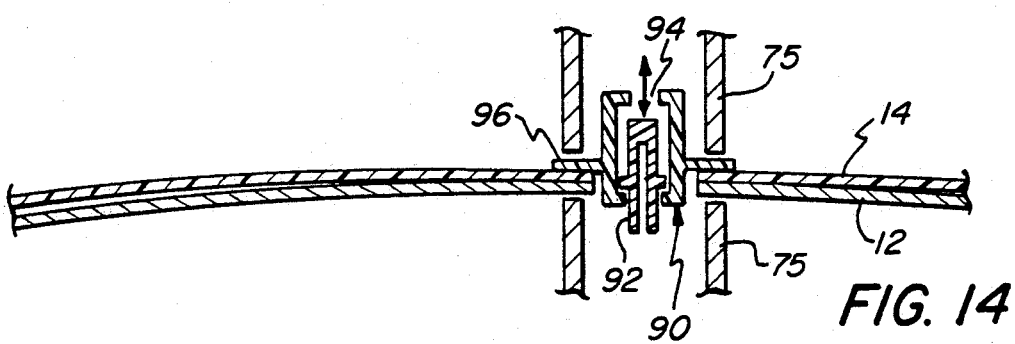
FIG. 14 is a cross sectional view showing a method of affixing a single piece valve to an enclosure layer.

The valve 28 is affixed to a backing layer as follows. An aperture 76, as shown in FIG. 5, sized to be contained within the diameter of the valve backing and base is made in the clothing 12. The aperture 76 may be a die cut hole or a slit or other aperture sufficient to permit passage of air therethrough. Another aperture 78, also as shown in FIG. 5 is made in the backing layer 14, similarly to aperture 76. The backing layer 14 is located against the clothing 12 with the apertures 76 and 78 in alignment. The valve base and stem 72 and 74 is located adjacent the backing layer 14 to surround and cover aperture 78. The annulus 70 is located adjacent the clothing 12 to surround and cover aperture 76. The valve pieces 70 and 72, 74 may then be fitted together to sandwich portions of the backing layer 14 and the clothing 12 between the flange 71 of the annulus 70 and the flange 73 of the base 72. The flanges 71 and 73 are welded together using a tubular die 75. Thus, the valve 28 is welded to the clothing 12 and backing layer 14, as shown in FIGS. 15-17, and is ready for the subsequent manufacturing steps of assembling the enclosure as described above. Of course, if the valve 28 is to be welded to a top layer of the applique 20, then the clothing layer 12 will be omitted, and the top layer will be substituted for the backing layer in the foregoing description.

Where a one piece valve is used, the step of affixing the valve is substantially the same. Referring to FIGS. 13 and 14, two different one piece valves are shown. In FIG. 13, the valve 80 is a conventional tube 82 with a plug 84 insertable in the tube to close the valve 80. In FIG. 14, the valve 90 has a sliding piston 92 that is movable to selectively open or close valve throat 94. In FIGS. 13 and 14, the valves 80 and 90 are shown being affixed to a backing layer 14 and a clothing layer 12. However, as noted, the valves may instead be located on a top layer instead, and moreover, may be affixed to the backing layer 14 without being also affixed to the clothing 12. With reference to FIG. 13, apertures are made in the backing layer 14 and the clothing 12, and the valve flange 86, which surrounds and contains the aperture in the backing layer 14, is welded to the backing and clothing layers by a tubular welding die 75. Identically, in FIG. 14, apertures are made in the backing layer 14 and the clothing 12, and the valve flange 96, which surrounds and contains the aperture in the backing layer 14, is welded to the backing and clothing layers by a tubular welding die 75.

Figure 23:
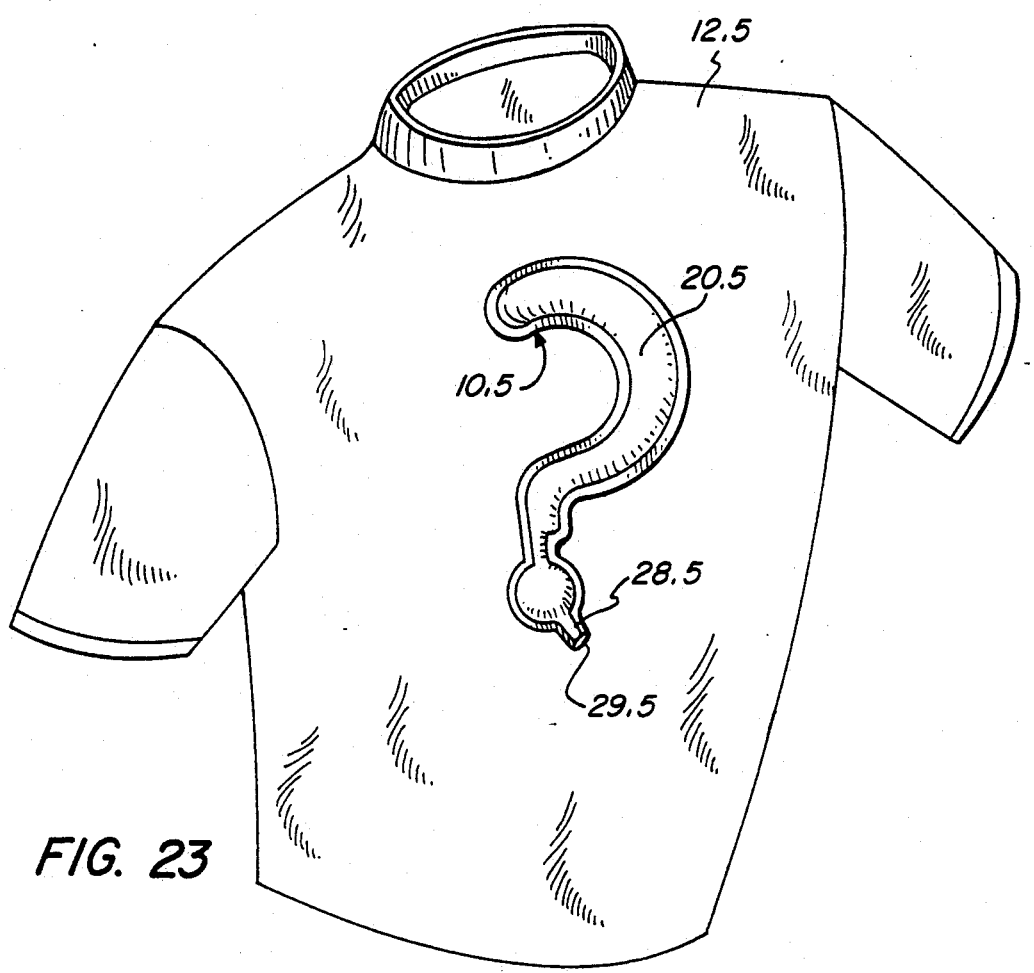
FIG. 23 is a perspective view of a sixth embodiment of an inflatable applique for an article of clothing in accordance with the invention, showing an integral valve.

An alternative integral valve 28.5 is shown in FIG. 23. Valve 28.5 comprises a flexible passage formed by the top and backing layers that has one open end 29.5. This simple valve 28.5 will preferably be detached from the clothing article 12.5, so that the applique 10.5 can be inflated through the opening 29.5, and the valve 28.5 may be folded over to seal the enclosure 10.5. The valve 28.5 may be held in its folded over position by tape, rubber bands, or by tucking the folded over portion under the backing layer.

In some instances, it may be desirable to make a self-inflating enclosure. In such case it would be possible to omit a valve. A self-inflating enclosure may be made by enclosing a gas generator within the enclosure which is activated by mechanical forces such as squeezing. For example, separate rupturable packages of sodium bicarbonate and an acid such as lemon juice or vinegar may be sealed in the enclosure. When inflation is desired, the packages are ruptured so that their contents combine to form a gas to inflate the enclosure.

Figure 24:
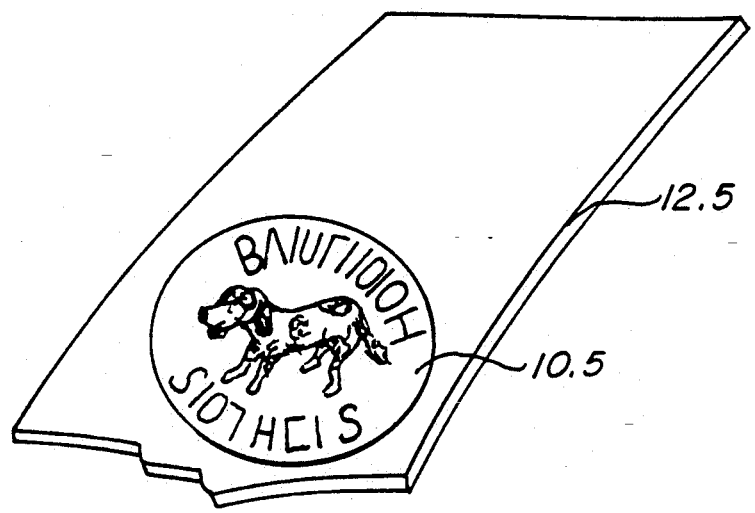
FIG. 24 is a perspective view of ana inflatable applique affixed to a fabric sheet.

FIG. 24 shows another embodiment of the invention in which an inflatable applique 10.5 is applied to a fabric sheet 12.5 to serve as a pillow or cushion on which a person may rest his head or on which he may sit. The fabric sheet 12.5 may be a beach towel or the like and the applique 10.5 would then serve as a pillow for the person's head. Alternatively, the fabric sheet 12.5 may be a blanket and the applique 10.5 would then serve as a seat cushion and the blanket could be wrapped around the person's body. This embodiment would be desirable for fans at outdoor sporting events such as fall football games. Preferably, the applique 10.5 has a decorative outline, for example, it might comprise a sports logo of a national football team. Alternatively, it might be provided with the outline of and be imprinted with a college seal or a college football team mascot. Other possible decorative outlines are apparent as described in the application.

The present invention provides a new product and method of manufacturing it. The examples given herein are not limiting of the invention, as it will have many applications and adaptions, all within the scope of the claims as follows.

I claim:

1. A method of manufacturing an inflatable applique for a fabric article, comprising the steps of:
   affixing a valve having a valve flange to an air impervious valve layer of a polymeric material, said affixing step including
      cutting an aperture sized to be contained within the valve flange in said valve layer,
      welding said valve flange to said valve layer with said flange surrounding and containing said aperture;
   affixing a backing layer to a fabric article;
   sealingly affixing a top layer to said backing layer at least around a peripheral zone of said top layer to form a substantially airtight inflatable enclosure that defines a three dimensional object;
   one of said backing and top layers comprising said valve layer;
   cutting said top and backing layers to provide said top and backing layers with complementary peripheral outlines; and
   separating excess top and backing layers from around the perimeter of said enclosure.

2. A method of manufacturing in accordance with claim 1, wherein said step of affixing said top layer to said backing layer comprises a welding step using a welding die.

3. A method of manufacturing in accordance with claim 2, wherein said step of cutting said top and backing layers occurs at substantially the same time as said welding step, said cutting step being performed by an outline cutting edge provided in the welding die.

4. A method of manufacturing in accordance with claim 3, wherein said step of affixing said backing layer to said clothing article occurs substantially at the same time as said steps of welding said top layer to said backing layer and cutting said said top and backing layers, said step of affixing said backing layer to said clothing comprising applying sufficient energy and pressure by said welding die to at least a peripheral portion of said backing layer to soften said peripheral portion sufficiently to cause said peripheral portion of said backing layer to penetrate interstices in said clothing article.

5. A method of manufacturing in accordance with claim 2, further comprising the step of: welding selected portions of said top layer to said backing layer at locations within the peripheral outline of said top and backing layers to provide said enclosure with at least one inflatable subenclosure of a desired outline operably connected with said enclosure and inflatable therewith.

6. A method of manufacturing in accordance with claim 4, further comprising the steps of:
   welding an additional layer of a soft flexible flexible polymer material to said backing layer with said clothing therebetween, simultaneously with the welding of said top layer to said backing layer and said backing layer to said clothing.

7. A method of manufacturing in accordance with claim 1, wherein said step of affixing a valve to said valve layer comprises:
   cutting an aperture sized to be contained within the valve flange in said fabric article;
   cutting an aperture sized to be contained within the valve flange in said backing layer;
   locating said backing layer against said fabric article with said apertures in said fabric article and backing layer in alignment;
   locating said valve flange on an outer surface of said backing layer with a body of said valve extending through said apertures and through said fabric article;
   welding said valve flange to said backing layer and causing said backing layer to soften and penetrate interstices in said fabric article;
   whereby said valve is affixed to said backing layer and said fabric article.

8. A method of manufacturing in accordance with claim 1, wherein said valve comprises a valve stem and base with a flange and a valve backing fittable together, both formed of a polymeric material, and wherein said step of affixing a valve to said valve layer comprises:
   cutting an aperture sized to be contained within the valve flange in said fabric article;
   cutting an aperture sized to be contained within the valve flange in said backing layer;
   locating said backing layer against said fabric article with said apertures in alignment;
   locating said valve backing adjacent said backing layer with said valve backing surrounding and containing said backing layer aperture;
   locating said valve flange adjacent said fabric article with said valve flange surrounding and containing said fabric article aperture;
   fitting said valve stem and base together with said valve backing to sandwich portions of said backing layer and said fabric article between said valve flange and valve backing;
   welding said valve flange to said backing layer and to said valve backing with a tubular die;
   whereby said valve is affixed to said backing layer and said fabric article.

9. A method of manufacturing in accordance with claim 1, wherein said fabric article comprises a towel.

10. A method of manufacturing in accordance with claim 1, wherein said fabric article comprises a blanket.

11. A method of manufacturing in accordance with claim 1, wherein said enclosure is located on an outer surface of said fabric article and projects outwardly therefrom.

12. A method of manufacturing in accordance with claim 11, wherein said enclosure is an inflatable cushion.

* * * * *